United States Patent [19]

Amanuma et al.

[11] Patent Number: 5,038,165
[45] Date of Patent: Aug. 6, 1991

[54] CAMERA WITH BUILT-IN SELF-TIMER

[75] Inventors: Tatsuo Amanuma, Ageo; Yoshiaki Ohtsubo, Chiba; Daiki Tsukahara, Hiratsuka, all of Japan

[73] Assignee: Nikon Corporation, Tokyo, Japan

[21] Appl. No.: 634,822

[22] Filed: Jan. 2, 1991

Related U.S. Application Data

[63] Continuation of Ser. No. 504,381, Apr. 4, 1990, abandoned.

[30] Foreign Application Priority Data

Apr. 7, 1989 [JP] Japan ................................ 1-41594[U]
Mar. 8, 1990 [JP] Japan ................................ 2-23280[U]

[51] Int. Cl.⁵ .............................................. G03B 13/36
[52] U.S. Cl. .................................. 354/402; 354/403; 354/418; 354/419; 354/267.1
[58] Field of Search ............... 354/400, 402, 403, 418, 354/419, 267.1, 195.1

[56] References Cited

U.S. PATENT DOCUMENTS 4,212,523 7/1980 Yamada et al. ................. 354/402
4,908,649 3/1990 Matsui et al. ................... 354/403
4,941,005 7/1990 Hameyama et al. ............. 354/195.1

Primary Examiner—Russell E. Adams, Jr.
Attorney, Agent, or Firm—Shapiro and Shapiro

[57] ABSTRACT

A camera with a built-in self-timer, flash and autofocus is disclosed. The camera is switchable between normal and self-timer modes. When in the normal mode, the auto focus device measures distance at the beginning of a photographic cycle. In self-timer mode, the auto focus device measures the distance at the beginning of the photographic cycle, and after the self-timer has counted down from its set time. A decision to use the flash is based on the first distance measurement and the scene brightness in the normal mode, and on the second distance measurement and scene brightness in the self-timer mode. If the decision is yes, a checking apparatus checks whether the flash capacitor has sufficient charge, and if not charges the capacitor.

6 Claims, 7 Drawing Sheets

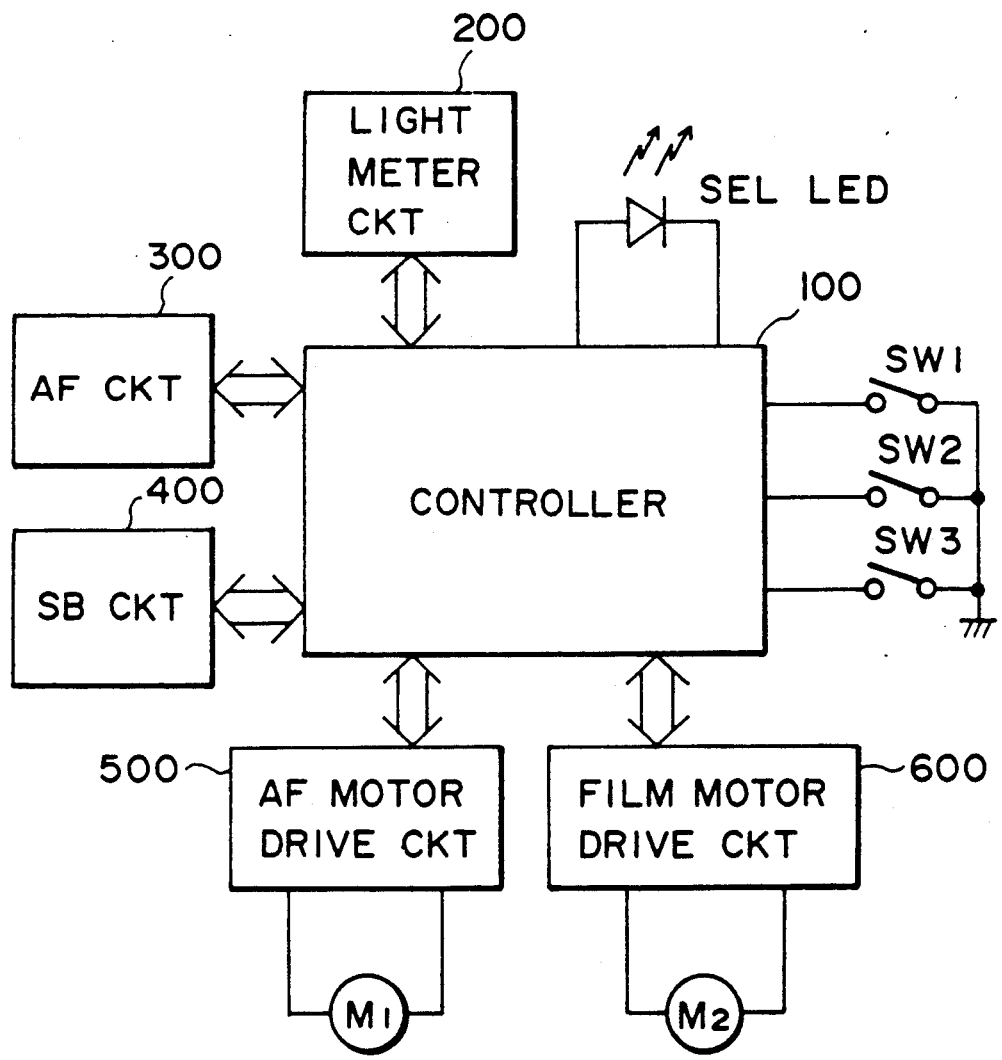
F I G. 1

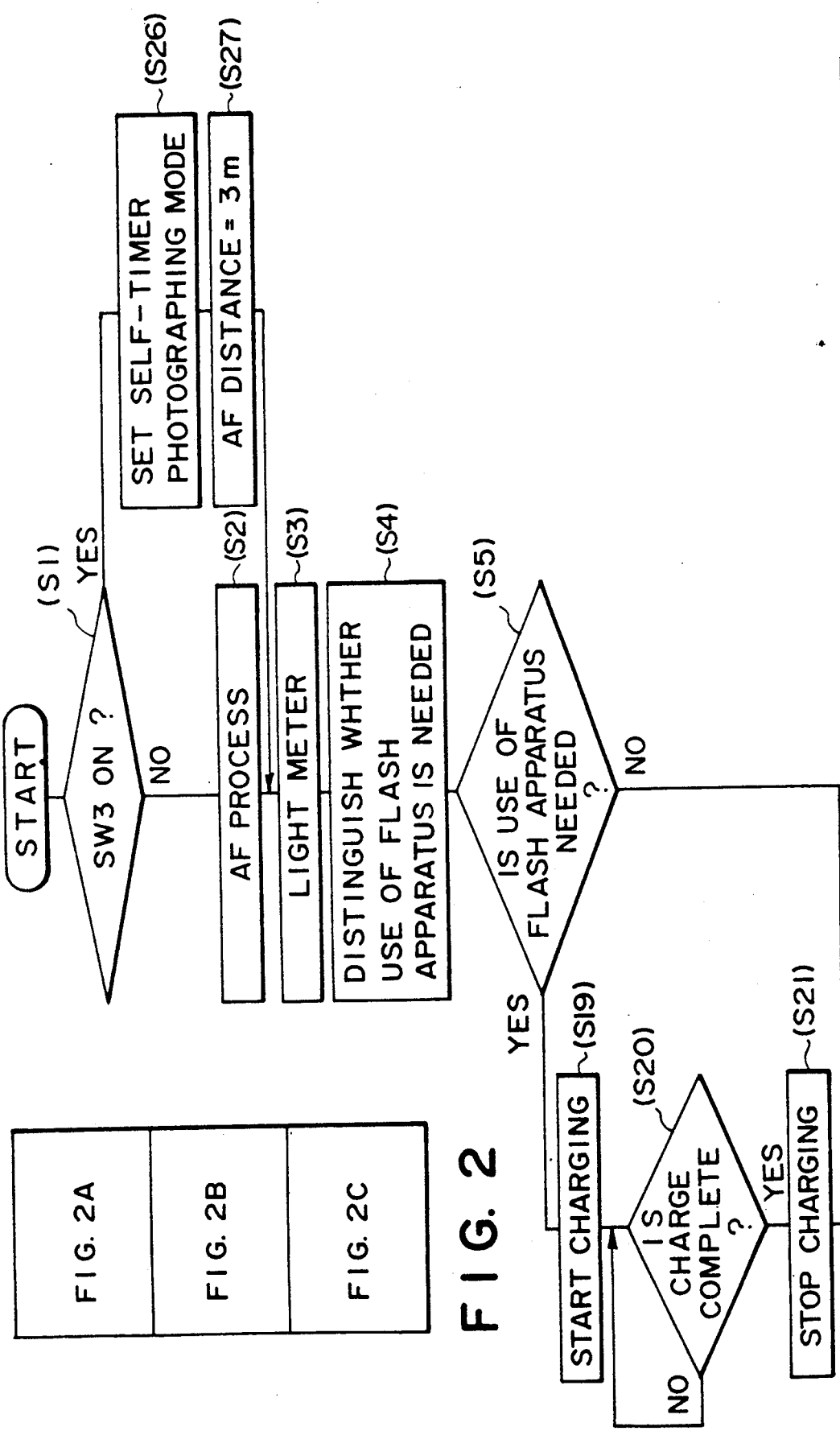

CAMERA WITH BUILT-IN SELF-TIMER

This is a continuation of application Ser. No. 504,381 filed Apr. 4, 1990, now abandoned.

BACKGROUND OF THE INVENTION

1. Field of the Invention

The present invention relates to a camera with built-in self-timer.

2. Related Background Art

With the conventional camera with built-in self-timer, when self mode is set by depression of self-operating button, first the distance to the target to be photographed is measured and after the completion of such measurement, counting of time by the self-timer is started. It is for the purpose of judging whether or not flash light should be used prior to the commencement of time count by the self-timer.

The purpose of making judgement whether or not flash light should be used prior to the commencement of time count by the self-timer is to prevent the failure of photographing due to uncharged state of the condenser before it occurs and warn the photographer that charging of condenser is incomplete, that is, flash photography is impossible by indicating the incomplete state of charging of condenser or prohibiting the photographing action.

The reason why the measurement of distance to the target is necessary at the judgement of whether flash should be used or not is because even when flash light is used, the light does not reach the target if, for example, it exists at almost indefinitely far apart distance and when the flash light does not reach the target, flash apparatus is not used. Such measurement of distance is made only after the camera is set in self mode.

In order to make judgement on whether flash light should be used or not, not only distance data but also light meter data (brightness data) are necessary. Generally speaking, when the brightness is low, judgement is made for the use of flash. Therefore when the brightness is low and the target is within the reaching range of flash light, it judges that flash light should be used.

According to the aforesaid conventional scheme, distance measurement is conducted after operating the self operating button and before the start of time count by the self-timer and therefore if there exists an object which is not the intended target within the measured range, the distance is measured in such way that the camera is focused on such other object. It is particularly so, for example, with the camera wherein the self operating button exists at the front of the body. Erroneous distance measurement is made when the hand or finger of the photographer covers the AF projector part at the operation of self operating button.

Thus it accompanies the problem that a photograph which is not focused on the intended target is obtained.

SUMMARY OF THE INVENTION

The present invention has been made in view of the aforesaid problem and its objective is to provide the camera with built-in self-timer which gives a photograph precisely focused on the target without making erroneous distance measurement.

In order to solve the aforesaid problem, the present invention makes such arrangement that the camera is equipped with the photographing start means to generated photographing start signal, light measuring means (200) to measure the brightness of the target and emit light meter signal distance measuring means (300) to measure the distance to the target and emit distance signal, an automatic focusing means (500) to adjust the focus of the photographing lens according to the said distance signal, the photographing means to execute photographing, a selection means to select either a normal photographing mode or self photographing mode, time counting means to start counting of time in response to the said photographing start signal in the said self photographing mode and with the completion of the said time count, cause the said photographing action, a flash apparatus (400) which emits the flash generated by the electric charge of the condenser at the time of the said photographing action, a judging means to judge whether the use of the said flash apparatus at the time of the said photographing action is necessary or not and emit necessary signal when the use of the flash apparatus is judged to be necessary, a checking means to check if the charging of the said condenser is enough or not when the Yes signal is emitted and if it is detected to be insufficient, give an alarm to that effect or prohibit the said photographing action, wherein the said judging means causes the said light measuring means (200) and said distance measuring means (300) to act in response to the said photographing start signal and generates the said Yes signal in the said ordinary photographing mode when it is so judged that the brightness of the said target is lower than the preset level and the said target is within the effective range of reach of the flash apparatus (400) based on the said light meter signal and the said distance signal, and in the said self photographing mode, causes action of the said light measuring means (200) at the first time point after generation of the said photographing start signal and when, from thus obtained light meter signal, the brightness of the said target is judged to be lower than the preset level, generates the said Yes signal and the said distance measuring means (300) is caused to act in the period from the said first time point and the time point prior to the start of the said photographing action in the said self photographing mode.

In the case of the camera with built-in self-timer provided by the present scheme, distance measuring means functions between the first time point after the generation of photographing start signal and the time point prior to the start of photographing action and as the result, the time required from the distance measuring action up to the exposure action becomes shorter and probability of erroneous distance measurement becomes extremely low.

Thus the present scheme provides a camera with built-in self-timer which enables to obtain the photograph focused on the target.

Hereunder is explained the example of embodiment of the present scheme in reference to the drawing.

BRIEF DESCRIPTION OF THE DRAWINGS

FIG. 1 is the block diagram of the example of embodiment of the present invention;

DESCRIPTION OF THE PREFERRED EMBODIMENTS

Figure 2B:
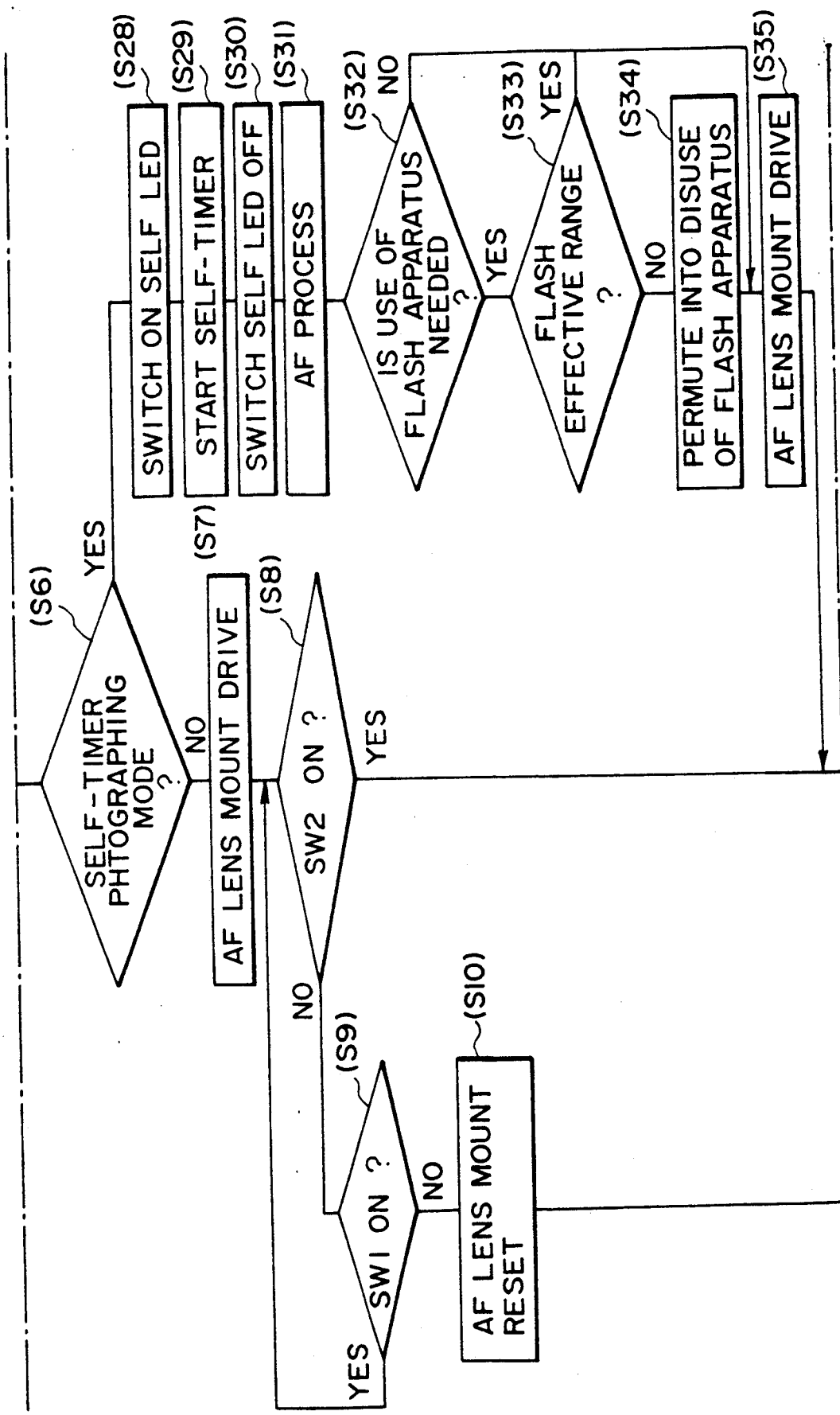
FIG. 2 is the flow chart to indicate the order of actions.

FIG. 1 is the block diagram of the example of embodiment of the present invention.

Control circuit 100 executes performance control of the entire camera. Light meter circuit 200 converts the brightness of light measured by the AE light receiving device (not shown) into electric signal and delivers the signal of thus measured brightness to the control circuit 100. AF circuit 300 performs distance measuring action and delivers the obtained distance data to the control circuit 100. SB circuit 400 causes the electronic flash apparatus (not shown) emit light upon receipt of the signal from the control circuit 100 and delivers the signal of charging complete or incomplete to the control circuit 100. AF motor drive circuit 500 drives the motor M, according to the data obtained by control circuit 100 from AF circuit 300 and causes zooming-out or zooming-in action of the lens mount up to the preset position. Film motor drive circuit 600 is the circuit to drive film motor M2 when the signal instructing winding or rewinding of film is received from the control circuit 100. Self display means SEL LED lights up when self photographing mode is set and prior to the start of time count by the self-timer and during counting of time, it is kept lighted or caused to flicker. Semi-depression switch SW1 is turned ON when the release button is halfly depressed and release switch SW2 is turned ON when release button is fully depressed. Self switch SW3 is turned ON when self operating button is operated.

Figure 2C:
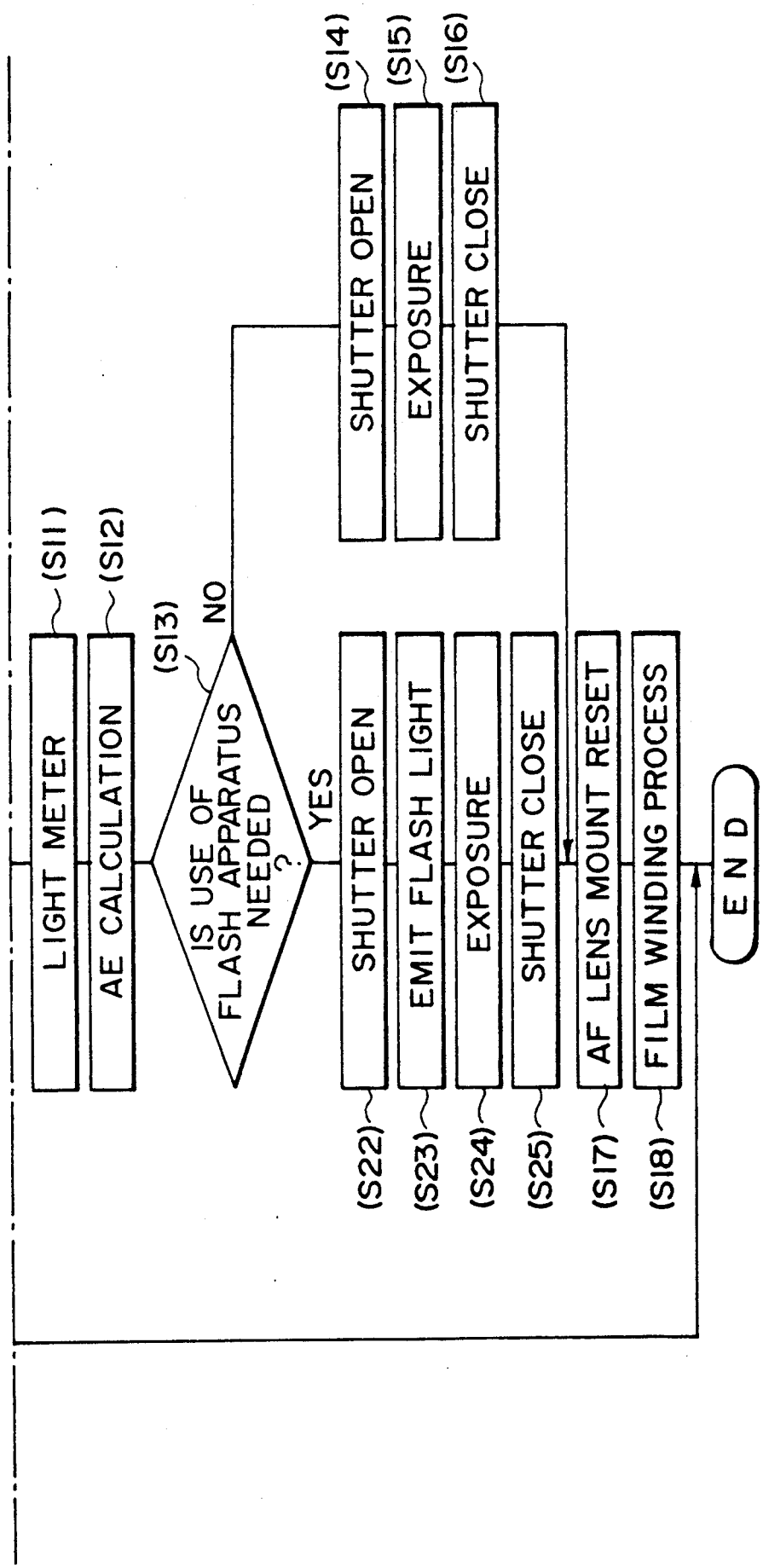

The performance of the camera with built-in self-timer having the above composition is explained hereunder in reference to the flow chart of FIG. 2.

The program is started up when the semi-depression switch SW1 engaged by half depression of the release button is turned ON or when self switch SW3 engaged by the operation of self button is turned ON.

Hereunder is explained the photographing mode which may be selected by the camera with built-in self-timer of the present embodiment. In the case of the present embodiment, either of the following 4 modes may be selected, namely.
1 Ordinary photographing mode
2 Flash photographing mode
3 Self photographing mode and
4 Self flash photographing mode
Hereunder are explained the control procedures of each mode according to the order steps.

In the case of ordinary photographing mode

When the semi-depression switch SW1 is turned ON responding to the semi-depression of release button, judgement is made whether the self switch SW3 is turned ON or not, i.e., whether the self operating button has been operated or not (step S1).

When the answer to step S1 is No, i.e., when it is judged that self operating button was not operated and self switch SW3 was not turned ON, AF process is performed and the distance to the target is measured (step S2) and light meter data are read (step S3).

Then whether the use of flash apparatus is necessary or not is judged based on the distance data and light meter data read at steps S2 and S3 (step S4). In such judgement process, when the target is within the range of reach of flash light and light meter data indicate the low brightness of the target, the use of flash apparatus is judged to be necessary.

Therefore, even when the target has low brightness if the distance to the target is far, the use of flash apparatus is judged to be unnecessary.

However in the against-the-light state, even when the target has high brightness, the use of the flash apparatus is judged to be necessary. It is judged to be in an against-the-light state when the difference in brightness between the central part and the peripheral part of the target area to be photographed exceeds certain level.

When judgement of whether the use of flash apparatus is necessary or not is made in step S4, whether the flash apparatus should be used or not is decided according to the result thereof (step S5). When the answer to step S5 is No, i.e., when the use of flash apparatus is judged to be unnecessary, it is judged whether the photographing mode is in self photographing mode or not (step S6). Such judgement is made by whether the self switch SW3 is turned ON or not.

When the answer to step S6 is No, i.e., when the mode is not in the self photographing mode, the lens mount is driven up to the preset position based on the distance data obtained in step S2 (step S7).

Then judgement is made whether the full depression switch SW2 is turned ON or not in response to the full depression of release button (step S8). When the answer to step S8 is No, i.e., when release button is not fully depressed, judgement is made whether the semi-depression switch SW1 is turned ON or not (step S9). If the answer to step S9 is Yes, i.e., when release button is semi-depressed, the mode resets the step S8 but if the answer is No, i.e., the release button is not semi-depressed, the lens mount is driven to the reset position (step S10) and the processing ends.

When the answer to step S8 is Yes, i.e., when release button is judged to be fully depressed, the light meter data are again read (step S11). Succeeding thereto, the degree of exposure appropriate for photographing is calculated by AE calculation based on the light meter data read at step S11 (Step S12).

Then judgement is made whether the use of flash apparatus is necessary or not based on the results of judgement made in step S4 (step S13). If the answer to step S13 is No, i.e., when use of flash apparatus is judged to be unnecessary, the shutter is released (step S14) and after elapse of exposure time (step S15), the shutter is closed (step S16). Then lens mount is driven to the reset position (step S17) and the film is wound by one frame (step S18) and one cycle of processing ends.

In the case of flash photographing mode

In the flash photographing mode, after the execution of steps S1–S4 in the loop of the aforesaid ordinary photographing mode, if step S5 is judged to be Yes, i.e., the use of flash apparatus is judged to be necessary, charging of condenser starts (step S19) and the system remains stand-by until charging completes (step S20) and when charging completes, charging stops (step S21) and the mode proceeds to step S6. In other words, by repeating the step S20 until charging of condenser ends, the later photographing actions are prohibited. In this case, it may alternatively be so arranged that warning is made to the photographer as to the incompleteness of charging of the condenser by the display provided by the display means provided at outside the camera.

Figure 3:
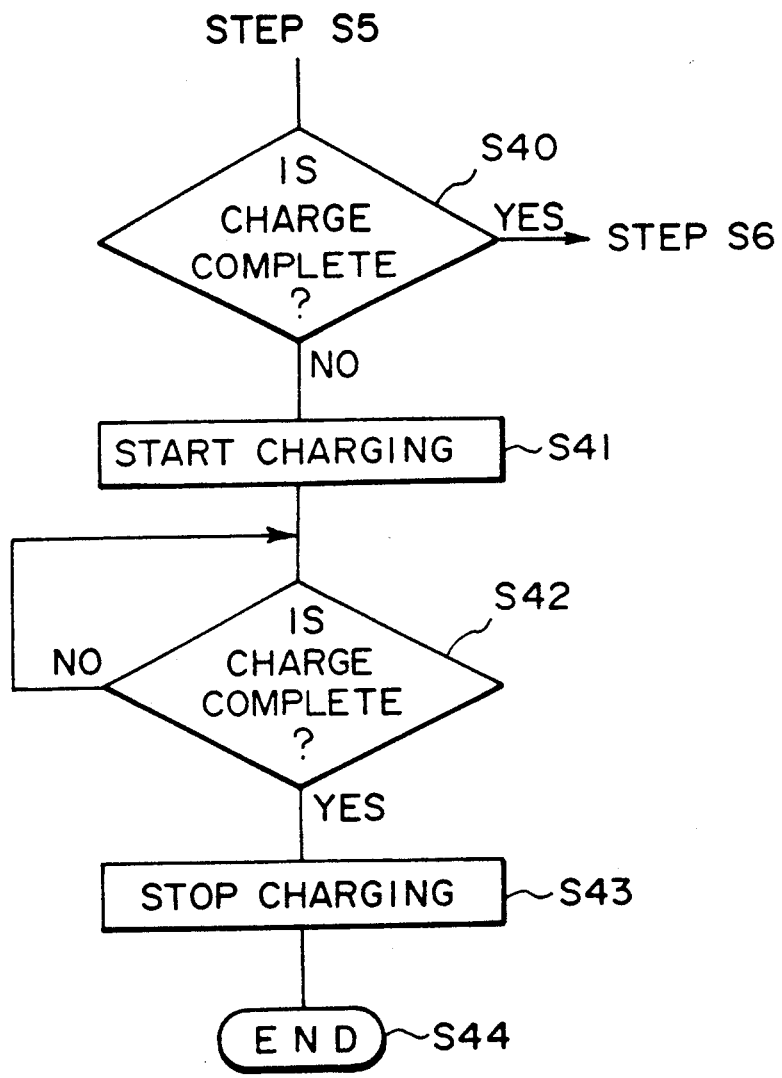
FIG. 3 is the flow chart to indicate an example of modification of the order of actions for charging the condenser of the flash apparatus.

The process flow for the case where the use of flash apparatus is judged to be necessary at step S5 may be modified as shown in FIG. 3. That is, when the answer is Yes at step S5, judgement is made on whether the charging of condenser is complete or not at step S40 and if it is complete, the mode proceeds to step S6 and if charging is incomplete, charging of condenser begins (step S41) and after being at stand-by state until charging completes (step S42) charging is stopped when charging completes (step S43) and one cycle of processing completes (step S44).

Further, through the steps S6, S7, S8, S11 and S12, when the use of flash apparatus is judged to be necessary at step S13, shutter is released (step S22) and simultaneously flash light is emitted (step S23). Then after exposure (step S24), the shutter is closed (step S25). Thereafter lens mount is driven to the reset position (step S17), film is wound by one frame (step S18) and one cycle of processing completes.

In the case of self photographing mode

In the self photographing mode, the mode is set (step S26) by turning ON the self switch SW3 in response to the operation of self operating button at step S1. Then the distance to the target is temporarily deemed to be 3 m and such temporary target distance is read (step S27). This temporary target distance of 3 m is the distance at which the target most probably exists.

Thereafter the mode proceeds to step S3–S6. In the present example of embodiment, the distance to the target is temporarily deemed to be 3 m at step S27 but alternatively it may be so arranged that the distance to the target is measured by the ordinary AF process and based on the obtained distance data, the judgement of step S5 is made.

At step S6, judgement is made whether the mode is self photographing mode or not and if the answer is Yes, the self LED installed at the front of the camera is lighted to inform the subject to be photographed that it is self photographing mode (step S28) and simultaneously the counting of time by the self-timer starts (about 10 sec) (step S29).

When time count by the self-timer completes, the light of self LED goes off (step S30) and thereafter AF circuit 300 is engaged and the distance to the target is measured as AF process (step S31).

After AF processing at step S27, judgement is made whether the use of flash apparatus is necessary or not (step S32). When the answer is Yes, i.e., the use of flash apparatus is judged to be necessary, the distance to the target measured at step S31 is compared with the effective flash range and whether the flash light can reach the target or not is judged (step S33). If the answer is No at step S33, i.e., when it is judged that the target is not within the effective flash range, the judgement at step S4 that the use of flash apparatus is necessary is replaced by the judgement that the use of flash apparatus is unnecessary (step S34).

In other words, even when the use of flash apparatus is judged to be necessary at step S4, if the target is not within the effective flash range in the AF process at step S31, flash light emission is prohibited. It is because when the distance to the target is too far, the flash light does not reach the target and flash light emission becomes a waste.

Thereafter, the lens mount is driven to the preset position based on the distance data measured at step S31 (step S35). Thereafter the mode proceeds to step S11 and the procedures similar to the processing loop in the aforesaid ordinary photographing mode are executed. At step S32, if the answer is No, i.e., if the use of flash apparatus is judged to be unnecessary, the mode proceeds to step S35.

If the answer is Yes at step S33, i.e., when flash light reaches the target, the mode also proceeds to step S35.

In the case of self flash photographing mode

In the self flash photographing mode, via the processing loop of the aforesaid flash photographing mode and self photographing mode, the judgement is made on whether or not the use of flash apparatus is necessary at step S13 and it gives the answer Yes, i.e., the use of the flash apparatus is judged to be necessary.

As stated above, whether the use of flash apparatus is necessary or not is judged at step S13 based on the result of judgement made at step S4.

In the ordinary photographing mode, judgement is made whether the user of flash apparatus is necessary or not based on the distance data and light meter data read at steps S2 and S3 but in the self photographing mode, a temporary target distance of 3 m (the distance at which the target most probably exists) is read in step S27 as the distance data.

Therefore in the self photographing mode whether the use of flash apparatus is necessary or not is judged on the basis of light meter data only. That is, in the self photographing mode, whatever the actual distance to the target may be (even when it is a far away distance), the temporary target distance (3 m) is read and it is regarded to be the distance to which the flash light effectively reach and as the result whether the user of flash apparatus is necessary or not is judged only by the light meter data, i.e., the brightness of the target.

When judgement is made at step S13, the mode proceeds to step S22 and the steps S22–25, S17 and S18 and executed.

As stated above, in the self photographing mode, the mode is set in response to the operation of self operating button, and the temporary target distance of 3 m is read and whether use of flash apparatus is necessary or not is judged on the basis of such temporary target distance and the light meter data to be read later. Actual measurement of the distance to the target is conducted immediately after counting of tie by self-timer.

According to such scheme, the time required from the distance measurement up to exposure action may be shortened and the possibility of erroneous distance measurement is reduced to an extremely small level.

In the aforesaid example of embodiment a temporary target distance is read for the judgement of whether the flash apparatus should be used or not and the measurement of actual distance to the target is made immediately after the completion of time count by self-timer but it may alternatively be so arranged that distance measurement is made to judge whether the use of flash apparatus is necessary or not and measurement of distance is conducted again immediately after the time count by the self-timer is completed.

In the aforesaid example of embodiment, if the camera used is the 3 point infrared active type auto-focus camera carrying for example a center-loss prevention means as the distance measuring means 300 or a passive type auto-focus camera which enables distance measurement for a wide area, the camera is free from erroneous measurement of distance at the time of distance measurement after the end of time counting by the self-timer in the self photographing mode and a well focused photograph is obtained, and therefore the present invention becomes all the more profitable.

Figure 4:
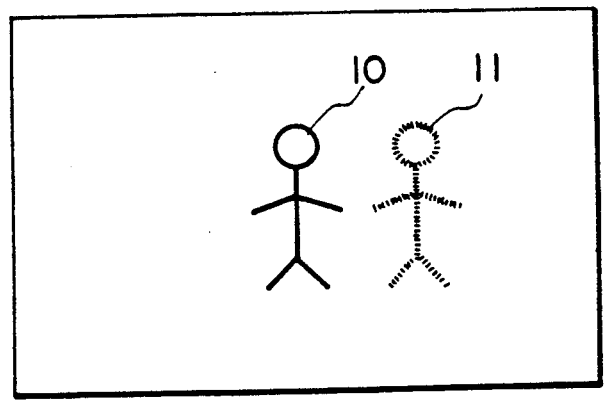
FIG. 4 is the drawing of the inside of the finder of an ordinary infrared active type auto-focus camera.
Figure 5:
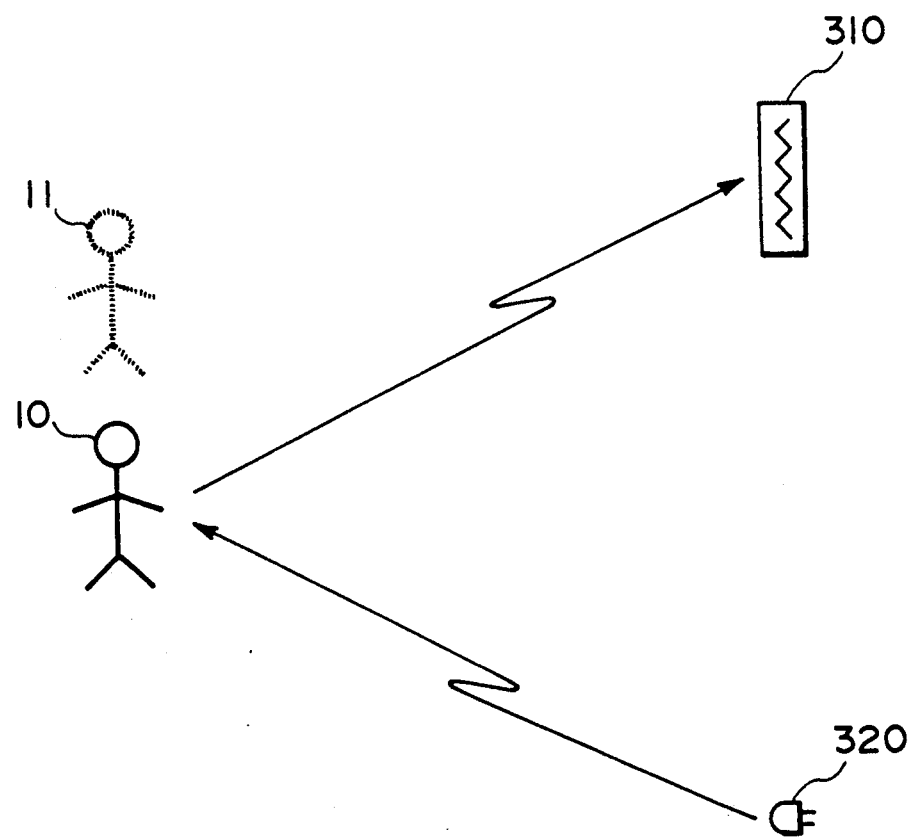
FIG. 5 is the drawing to explain the process of driving the distance measuring means while keeping the finder in the state of FIG. 4.

FIG. 4 indicates the inside of the finder of the ordinary infrared active type auto-focus camera where the target 10 is located at the center inside the finder. FIG. 5 shows the state of the finder of FIG. 4 when distance measuring means is engaged whereby the infrared ray coming from infrared LED 320 projects on the target 10 and its reflection enters into the light receiving device 310, thus measuring the distance to the target and providing the photograph properly focused on the target 10. When there exists no target 10 but only the target 11 exists, since infrared ray does not project on the target 11, a photograph not focused on the target 11 is obtained. When distance measuring means 300 is engaged after the end of time count by self-timer in the self photographing mode, the photographer may sometimes become the target and the aforesaid unfocused photograph is obtained.

Figure 6:
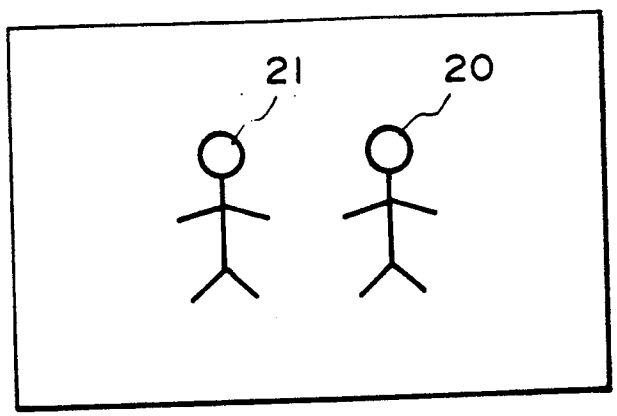
FIG. 6 is the drawing to show the inside of the finder of 3-point infrared active type auto-focus camera and FIG. 7 is the drawing to explain the case of driving the distance measuring means while keeping the finder in the state of FIG. 6.
Figure 7:
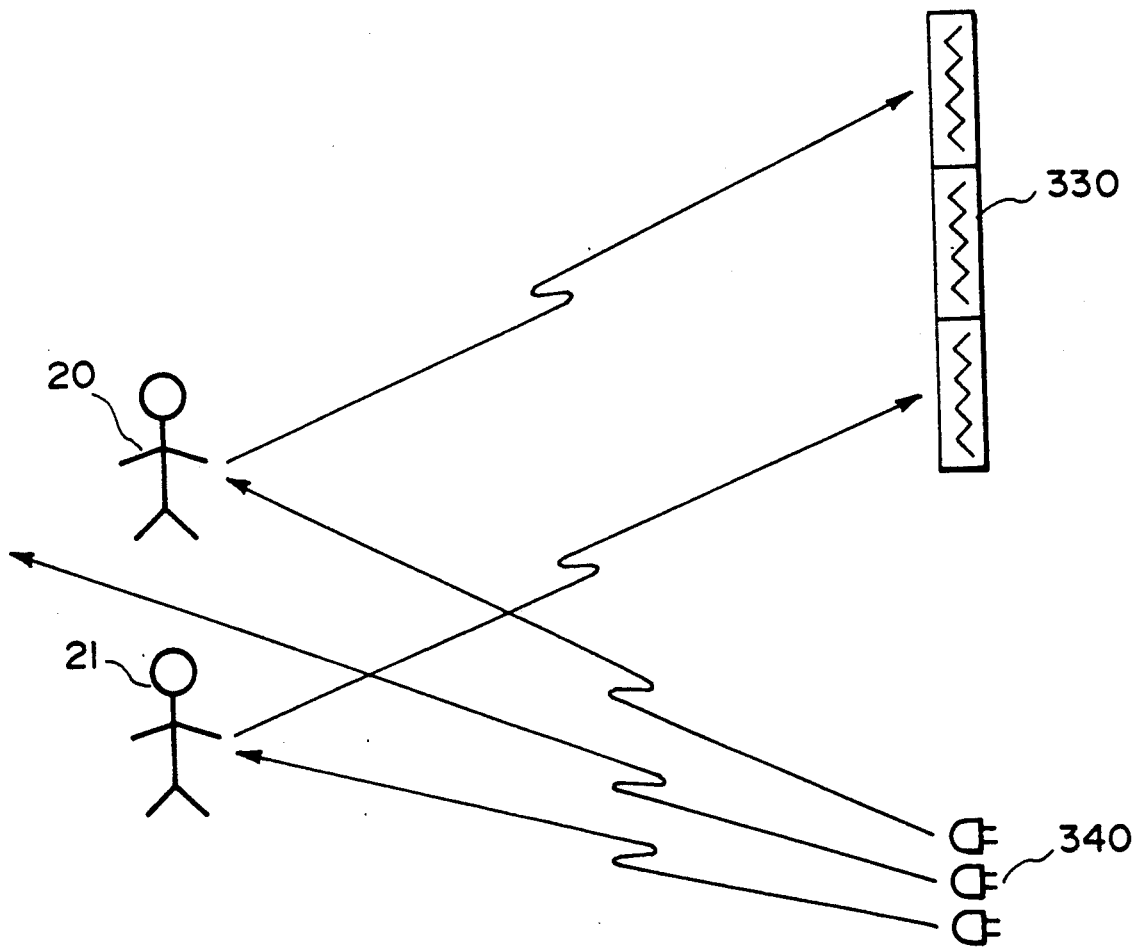

FIG. 6 shows the inside of the finder of 3 point infrared active type auto-focus camera, which shows the state where the target 20 and target 21 are side by side at both sides of the center of the finder screen. FIG. 7 shows a part of another embodiment of the present invention. FIG. 7 indicates the case when distance measuring means 300 is driven while the finder is in the state as shown in FIG. 6 and infrared ray is emitted in 3 directions respectively from 3 infrared LEDs 340. The said infrared ray projects on the targets 20 and 21 and their reflections enter into the three serially connected light receiving devices 330 and thus the distance to the target is measured.

Based on the data obtained in the above step, it becomes possible to photograph the target by focusing the lens, for example, at the target located closet to the camera and thus it becomes free from erroneous measurement.

In the aforesaid example of embodiment, the camera is set in the self photographing mode and time count by the self-timer begins when the self operating button is operated but the scheme of the present invention is not limited thereto but may be applicable to such system wherein the self photographing mode is set by operating the self operating button and time count begins with depression of release button.

In the case of the camera with built-in self-timer provided by this scheme, distance measuring means starts to act in between the first time point after generation of photographing start signal and the time point prior to the start of photographing action in the self photographing mode and therefore the time required from the distance measuring action up to exposure action is made shorter and the probability of erroneous distance measurement is extremely small. Thus the present invention provides a camera with built-in self-timer which enables to obtain the photograph properly focused on the target.

We claim:

1. A camera comprising:
   photographing means for performing a photographing action;
   means for generating a photographing start signal which starts said photographing action;
   light metering means for metering brightness of a target and generating a light metering signal;
   selection means for selecting one of an ordinary photographing mode and a self photographing mode;
   time counting means for counting time in response to said photographing start signal when said self photographing mode is selected and causing said photographing means to perform said photographing action after the elapse of a predetermined period;
   distance information producing means for producing a first distance information signal in response to said photographing start signal regardless of said selection means, said distance information producing means producing a second distance information signal in response to the completion of said time counting when said self photographing mode is selected;
   capacitor means;
   supplying means for supplying charges to said capacitor means;
   flash means for emitting flash light on the basis of the charges stored in said capacitor means;
   judging means for judging, based on said light metering signal and said first distance information signal, and irrespective of said selection means, whether the use of said flash means is necessary or not, and generating a first judgment signal when the judging indicates that the use of said flash means is necessary; and
   checking means for checking whether said capacitor means is sufficiently charged or not in response to said first judgment signal;
   wherein said judging means judges, on the basis of said second distance information signal irrespective of said light metering signal, whether the use of said flash means is necessary or not, and generates a second judgment signal for inhibiting said flash means from emitting flash light when the judging based on said second distance information signal indicates that the use of said flash means is not necessary.

2. A camera according to claim 1, wherein said first distance information signal indicates a fixed distance when said self photographing mode is selected.

3. A camera according to claim 1, wherein said light metering means generates another light metering signal after the judging based on said second distance information signal when said self photographing mode is selected, and wherein said photographing means performs said photographing action on the basis of the last-mentioned light metering signal.

4. A camera according to claim 1, wherein said light metering means generates another light metering signal after the judging based on said first distance information signal when said ordinary photographing mode is selected, and wherein said photographing means performs said photographing action on the basis of the last-mentioned light metering signal.

5. A camera comprising:
   photographing means for performing a photographing action;
   light metering means for metering brightness of a target and generating a light metering signal;
   capacitor means;
   supplying means for supplying charges to said capacitor means;

flash means for emitting flash light on the basis of the charges stored in said capacitor means;

judging means for judging that the use of said flash means is necessary on the basis of said light metering signal and generating a judgment signal;

checking means for checking whether said capacitor means is sufficiently charged or not in response to said judgment signal;

time counting means for counting a predetermined period after the generation of said judgment signal;

distance information producing means for producing a distance information signal after the completion of said predetermined period; and adjusting means for adjusting the focus of a photographing lens on the basis of said distance information signal, said photographing means performing the photographing action after the completion of the focus adjusting.

6. A camera according to claim 5, wherein said light metering means generates another light metering signal after the production of said distance information signal, and wherein said photographing means performs said photographing action on the basis of the last-mentioned light metering signal.

* * * * *